F. M. FOSTER.
Sulky-Plow.
No. 204,890.  Patented June 18, 1878.
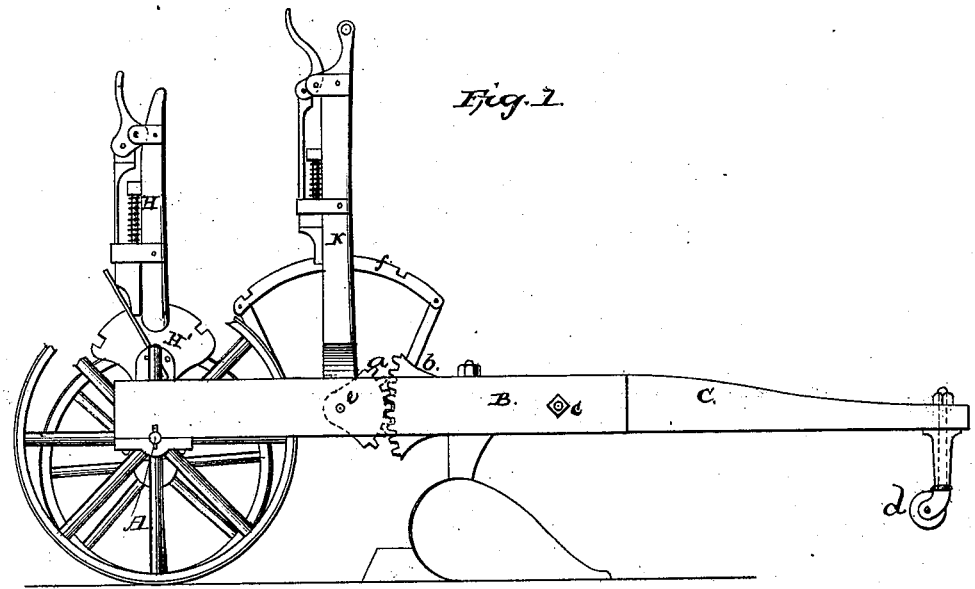
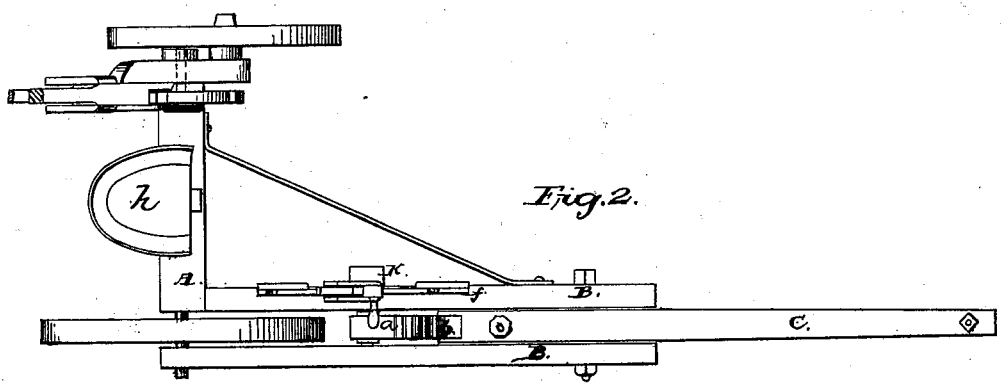

UNITED STATES PATENT OFFICE.

FRANCIS MARION FOSTER, OF MONTGOMERY COUNTY, ASSIGNOR OF ONE-HALF HIS RIGHT TO WILLIAM ALFRED PEFFER, OF COFFEYVILLE, KANSAS.

IMPROVEMENT IN SULKY-PLOWS.

Specification forming part of Letters Patent No. 204,890, dated June 18, 1878; application filed April 25, 1877.

*To all whom it may concern:*

Be it known that I, FRANCIS MARION FOSTER, of Montgomery county, in the State of Kansas, have invented a new and useful Improvement in Riding or Sulky Plows, which improvement is fully set forth in the following specification and accompanying drawings.

The object of my invention is twofold—first, to construct a riding or sulky plow with or without a tongue or pole, so that the plow shall be in front of the carriage in view of the plowman; second, to raise the plow out of the earth and lower it again by means of a gearing working at the rear end of the beam.

The carriage is attached to the plow by means of two arms, one on each side of the beam, rigid to the carriage-axle, between the front ends of which the plow-beam is pivoted.

Figure 1 in the accompanying drawing is a side view of the plow in working position, and Fig. 2 is a plan or top view of the same. The plow-share is six inches in the earth, as in the act of plowing.

The figures exhibit the gearing, one part of which is attached to the rear end of the beam at $b$, the other part, $a$, working on a fulcrum, $e$, which is a bolt running through the carriage-arms. This movable gearing $a$ is worked by a lever, K, which moves along a notched quadrant, $f$, and is kept in position by a ratchet springing into the notches. A guide-wheel, $d$, works under the front end of the beam on the unplowed ground, and on a plane higher than the share.

A is the carriage-axle, on which the larger carriage-wheel revolves. This wheel follows immediately after the plow and in the furrow.

It will be seen that when the lever K is drawn backward the gearing raises the rear end of the beam, pressing the guide-wheel on the earth, placing the weight of the plow on the guide-wheel and carriage, thus raising the plow out of the ground.

When plowing, the guide-wheel which is on the unplowed ground ahead of the plow is just the depth of the furrow higher than the carriage-wheel which is in the furrow behind the plow. When in the act of plowing, in order to raise the plow wholly out of the ground, it must be raised the height of the furrow's depth, so that when the plow is moved forward far enough for the carriage-wheel to get on the same level with the guide-wheel the share will be considerably above the ground.

The guide-wheel may be used for regulating the depth of the furrow or not, just as is desired. In this invention it is designed, chiefly, to be used when the plow is to be raised and carried out of the ground.

The team is attached at the clevis, and a tongue or pole may be used or not, my drawing not showing a tongue. The tongue may be attached, by straps, at the bolt $c$.

The other carriage or land wheel has an attachment to regulate the level of that end of the carriage-axle. This wheel is journaled upon the lower end of the lever H, which is centrally pivoted upon the end of the axle A. The lever is provided with a spring-pawl, which engages with a notched plate, H', and holds the lever at any desired point to adjust the height of the wheel.

The driver's seat is represented by $h$ in Fig. 2.

Having thus described my invention, what I claim as new, and desire to secure by Letters Patent, is—

1. In a sulky-plow, the combination of the axle A, rigid arms B B, plow-beam C, pivoted between said arms and provided with segment-gear $b$, and elbow-lever K, having geared segment $a$, substantially as shown and described.

2. The axle A, arms B B, lever K, provided with segment-gear $a$ and rack $f$, in combination with pivoted plow-beam C, having segment-gear $b$ and caster-wheel $d$, substantially as shown and described.

FRANCIS MARION FOSTER.

Witnesses:
LUTHER PERKINS,
W. A. PEFFER.